Aug. 11, 1925.  1,549,550
C. A. HOXIE
TELEPHONE INSTRUMENT
Filed Dec. 1, 1921
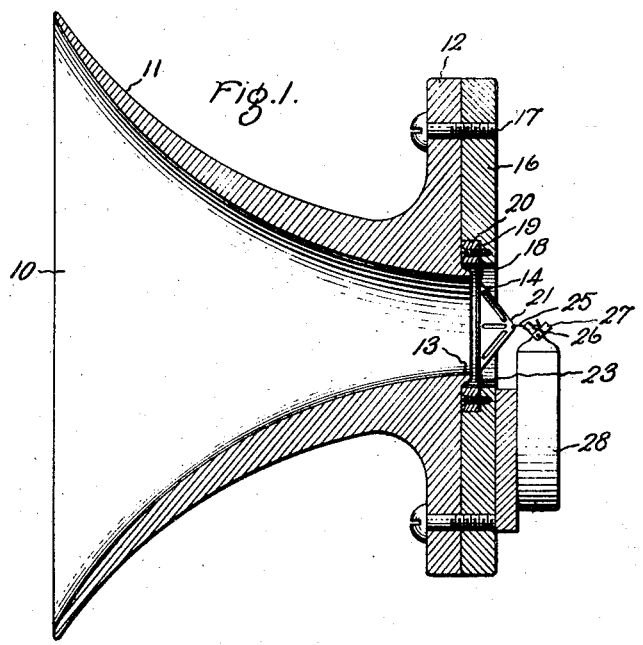
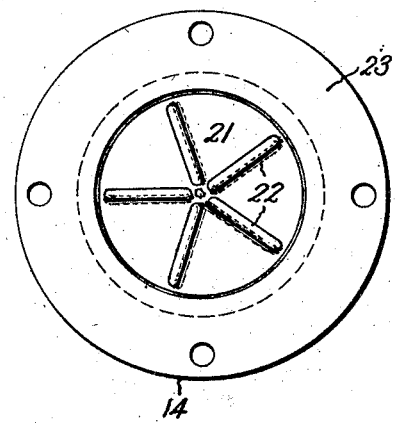
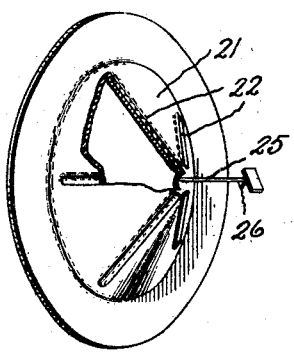
Inventor:
Charles A. Hoxie,
by His Attorney.

Patented Aug. 11, 1925.

1,549,550

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

TELEPHONE INSTRUMENT.

Application filed December 1, 1921. Serial No. 519,060.

*To all whom it may concern:*

Be it known that I, CHARLES A. HOXIE, a citizen of the United States, residing at Schenectady, county of Schenectady, State of New York, have invented certain new and useful Improvements in Telephone Instruments, of which the following is a specification.

This invention relates to sound transmitting and receiving instruments and particularly to an improved diaphragm for use in such instruments.

One object of my invention is to produce a diaphragm which, when embodied in a transmitting instrument, shall be extremely sensitive to sound waves regardless of their amplitude or frequency.

In order that a transmitting diaphragm do a certain amount of work and also to be sensitive to sound vibrations, several conditions must be fulfilled. It must be so formed as to receive a certain amount of energy, that is, it must present to the incoming wave a certain minimum surface;
it must be of light mass and the forces set up within the diaphragm itself upon its distortion by the sound wave must be such as will quickly return the diaphragm to its original form whenever the distorting force is removed. For the last condition the diaphragm should have a high natural period and preferably one which is above the limits of audition. Furthermore, to accurately reproduce the impulses corresponding to sound waves without distortion, it is advisable that the natural vibrations of the diaphragm be confined as much as possible to the fundamental frequency, that is, the diaphragm should vibrate as a whole without the formation of nodes and loops at points within the body of the diaphragm.

In the preferred embodiment of my invention, I secure the foregoing results by means of a circular diaphragm of light mass formed with a rigid cone-shaped central portion and a flexible outer portion, the outer portion being secured to a suitable support and the central portion being free to vibrate.

While the diaphragm constructed in accordance with my invention is applicable to receiving as well as to transmitting instruments, it is particularly adapted for use in the transmitting device disclosed in my copending application, Serial No. 471,228, filed May 20, 1921, and assigned to the same assignee as the present application, wherein the diaphragm serves to actuate a mirror to cause a light beam to vibrate in accordance with the sound waves received.

Further objects and advantages will appear from the following description taken in connection with the accompanying drawing, wherein Fig. 1 illustrates in section a telephone transmitting instrument embodying my invention; Fig. 2 shows in front elevation the diaphragm used therein, and Fig. 3 is a perspective view of the inner portion of the diaphragm.

Referring to Fig. 1, 10 represents a horn or mouth piece having the usual hollow flared portion 11 and a flat annular supporting portion 12. Projecting rearwardly at the inner end of the opening through the flaring member is an annular bead 13 designed to direct the sound waves toward the center of the diaphragm 14. A base or backing 16 is secured to the flat portion 12 by means of screws 17 and is provided at its center with an opening 18 formed with a shoulder 19. The diaphragm 14 is firmly held at its outer edge against the shoulder 19 by means of a ring 20 which is screwed to the shoulder.

The diaphragm 14 is constructed of a central cone-shaped portion 21 formed with radial ribs 22 to secure rigidity of the cone and a flat annular flexible portion 23 secured to the outer edge of the cone. The cone portion 21 is preferably constructed of sheet aluminum which is pressed into the form shown. In the case of very light diaphragms, such as are used with the transmitter instruments above referred to, where the cone may be $\frac{1}{4}$" or less in diameter and composed of material .0005 of an inch or less thick, a convenient method of forming the cone without injury to the metal is by placing a sheet of metal over a concave mould of the form desired and forcing the sheet into the mould by compressed air. The outer portion 23 of the diaphragm is preferably formed of mica and is cemented to the base of the cone. In the case of the transmitter referred to in the above application, this annular piece may be $\frac{1}{32}$" wide and .0002" thick. At 25 I have shown a wire secured at one end to the apex of the cone and the other end to a V-shaped shaft 26 which is adapted to carry a mirror or similar element. The shaft is held in jewel bearings 27 by means of a magnet 28. As the mounting of the shaft is not a part of the present invention, it will not be further described.

It will be seen that by attaching the wire to the apex of the cone, the same may be made to impart a motion to the wire without itself being distorted to any appreciable extent. It will also be seen that the flexible portion of the diaphragm being narrow, annular in form and secured to the rigid central member at one edge and to the rigid support at the other edge, there is practically no possibility that wave nodes and loops will be set up therein which will cause a distortion of the sound wave form.

While I have described my improved diaphragm as embodied in a telephone transmitter, it is obvious that the same may be used with a receiver, in which case the diaphragm might be actuated by the wire 25 or some other suitable means.

What I claim as new and desire to secure by Letters Patent of the United States, is,—

1. A diaphragm adapted to vibrate in accordance with the complex waves of sound vibrations comprising a rigid central portion and resilient peripheral portion, the combined mass of said portions being so small that the natural period of vibration of the diaphragm is substantially above the limits of audition.

2. A diaphragm adapted to vibrate in accordance with the complex waves of sound vibrations comprising a rigid cone-shaped body portion and a resilient peripheral supporting portion, the combined mass of said portions being so small that the natural period of vibration of the diaphragm is substantially above the limits of audition.

3. A diaphragm adapted to vibrate in accordance with sound or similar waves having a metallic cone-shaped central portion and a flat peripheral portion formed of thin mica cemented to said central portion, and means for supporting the diaphragm from the outer edge of said peripheral portion.

4. A diaphragm having a high natural period of vibration comprising an aluminum cone-shaped body portion substantially one-half mil in thickness and a peripheral mica portion substantially two tenths of a mil in thickness, said peripheral portion being secured to and adapted to support said body portion.

5. A telephone transmitter provided with a diaphragm, a shaft connected with said diaphragm, and a mirror secured to said shaft, said diaphragm, shaft, and mirror having a natural frequency of vibration above the limits of audition.

6. A diaphragm adapted to vibrate in accordance with sound vibrations comprising a thin, rigid, aluminum body portion and a thin mica marginal portion, said marginal portion being secured to and adapted to support said body portion.

In witness whereof, I have hereunto set my hand this 30th day of November, 1921.

CHARLES A. HOXIE.